(12) United States Patent
Bao et al.

(10) Patent No.: US 8,577,882 B2
(45) Date of Patent: Nov. 5, 2013

(54) METHOD AND SYSTEM FOR SEARCHING MULTILINGUAL DOCUMENTS (75) Inventors: Shenghua Bao, Beijing (CN); Jian Chen, Beijing (CN); Zhong Su, Beijing (CN); Dong Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 122 days.

(21) Appl. No.: 12/914,012

(22) Filed: Oct. 28, 2010

(65) Prior Publication Data
US 2011/0106805 A1 May 5, 2011

(30) Foreign Application Priority Data
Oct. 30, 2009 (CN) .......................... 2009 1 0211383

(51) Int. Cl.
*G06F 17/30* (2006.01)
(52) U.S. Cl.
USPC ......................................... 707/736; 707/737
(58) Field of Classification Search
USPC .................. 707/736, 737, 999.002–999.005; 715/264
See application file for complete search history.

(56) References Cited

U.S. PATENT DOCUMENTS 5,012,522 A 4/1991 Lambert
2008/0249891 A1* 10/2008 Gura ................................ 705/27

FOREIGN PATENT DOCUMENTS

WO WO 2004/044844 * 5/2004

OTHER PUBLICATIONS

Wen-Cheng Lin et al.; "Integrating textual and visual information for cross-language image retrieval: A trans-media dictionary approach"; ScienceDirect for Information Processing and Management 43; dated Oct. 2006; pp. 488-502.*
Said Radhouani et al.; "Domain Knowledge Conceptual Inter-Media Indexing" for CIKM, dated Nov. 2007; pp. 495-503.*
Turk et al., "Face Recognition Using Eigenfaces", Proc. IEEE Conf. on Computer Vision and Pattern Recognition, 1991, pp. 586-591.
Lowe, "Distinctive image features from scale-invariant keypoints," International Journal of Computer Vision, 2004, pp. 91-110.
Bay et al., "Surf: Speeded up robust features", Computer Vision—ECCV 2006, 2006, pp. 404-417.
Tuytelaars et al., "Vector quantizing feature space with a regular lattice", Proceedings of the International Conference on Computer Vision, 2007, 8 pages.
Philbin et al. "Lost in quantization: Improving particular object retrieval in large scale image databases", CVPR, 2008, 8 pages.
Philbin et al., "Object Retrieval with Large Vocabularies and Fast Spatial Matching," Proc. of Conference on Computer Vision and Pattern Recognition (CVPR), 2007, 8 pages.
Chengzhi et al., "Survey on Multilingual Document Clustering", New Technology of Library and Information Service, 2009, pp. 31-36.

* cited by examiner

*Primary Examiner* — Monica Pyo
(74) *Attorney, Agent, or Firm* — Cantor Colburn LLP; Dwayne Nelson (57) ABSTRACT

A method, system and computer program product for searching multilingual documents. The method includes the steps of: receiving a search request based on at least one language; searching a first relevant document using the search request where the first relevant document (1) is written in a first language and (2) has a first image; finding a second relevant document having a second image which is similar to the first image and is written in a second language; and searching a second relevant document using the search request.

17 Claims, 5 Drawing Sheets

Doc1: Chinese    Doc2: Japan    Doc3: Arabian    Doc4: Russia

METHOD AND SYSTEM FOR SEARCHING MULTILINGUAL DOCUMENTS

CROSS-REFERENCE TO RELATED APPLICATION

This application claims priority under 35 U.S.C. §119 from Chinese Patent Application No. 200910211383.6 filed Oct. 30, 2009, the entire contents of which are incorporated herein by reference.

BACKGROUND OF THE INVENTION

The present invention generally relates to the field of information processing technology. More specifically, a technique for searching multilingual documents is shown.

With the proliferation of the Internet, the world has become increasingly flat with information communication becoming more frequent. This greatly increases the amount of information available to the normal user. For an event or object, there can be a huge amount of interrelated reports, reviews or descriptions from different angles and in different languages. However, a user is usually versed in one language. Therefore, it is desired to conveniently find multilingual documents of interest with a searching request from the user in one language so as to provide useful assistance to the user.

SUMMARY OF THE INVENTION

Accordingly, one aspect of the present invention provides a method for searching multilingual documents, the method including the steps of receiving a search request based on at least one language; searching a first relevant document using the search request where the first relevant document (1) is written in a first language and (2) has a first image; finding a second relevant document having a second image which is similar to the first image and is written in a second language; and searching a second relevant document using the search request.

Another aspect of the present invention provides a system for searching multilingual documents, the system including: means for receiving a searching request based on at least one language; means for searching a first relevant document using the search request where the first relevant document (1) is written in a first language and (2) has a first image; means for finding a second relevant document having a second image which is similar to the first image and is written in a second language; and means for searching a second relevant document using the search request.

Another aspect of the present invention provides a computer readable storage medium tangibly embodying a computer readable program code having computer readable instructions which when implemented, cause a computer to carry out the steps of: receiving a search request based on at least one language; searching a first relevant document using the search request where the first relevant document (1) is written in a first language and (2) has a first image; finding a second relevant document having a second image which is similar to the first image and is written in a second language; and searching a second relevant document using the search request.

DETAILED DESCRIPTION OF THE PREFERRED EMBODIMENTS

As prevalent practice, current search technology usually searches relevant documents by translating the searching request inputted from a user into a corresponding searching request in other language using a machine, and then conducting search for the documents in the corresponding language based on the translated searching request in the other language. However, such technology has many defects.

A traditional computer translation is based on statistical learning, where the words or speeches in one kind of natural language are translated into another kind of natural language by a computer program. Currently, some translation machines can perform translation to a certain extent based on existing vocabulary correspondence and some grammatical structures. However, the quality of machine translation is often dependent on the differences between in vocabulary, grammatical structure, language family, or even in culture of the input and output languages.

For example, English and Dutch both belong to the indo-European family, and thus the results of machine translation between these two languages are generally much better than the results of translation between Chinese and English. Besides, expeditious development of a network generates a large amount of new vocabulary, which also is a challenge to machine translation. Generally speaking, machine translation is still far from replacing professional (manual) translation and cannot render a formal translation yet. This is due to inaccurate translation results. Moreover, the searching requests from users are often personalized, making accurate translation a greater challenge. Given an inaccurate translated searching request, a number of irrelevant documents will be searched instead of providing users with relevant documents of interest. As a result, the burden on the user is increased and the user experience is poor, since the documents of the user's concern cannot be searched.

In view of the above, there is need to provide a method and a system for searching multilingual documents, in order to overcome one or more defects in the prior art. Hereinafter, detailed description will be made with reference to the exemplary embodiments of the present invention, and examples of all embodiments are illustrated in the accompanying drawings, where same reference numbers always indicate same components. It should be understood that the present invention is not limited the disclosed exemplary embodiments. It should be further understood that not every feature of the method and device is essential to implement the present invention as claimed by any claim. Further, in the whole disclosure, when displaying or depicting a processing or method, the steps of the method can be performed in any sequence or simultaneously, unless it is clear from the context that implementation of a step depends on preceding implementation of another step. Besides, between steps are allowed prominent time intervals.

Figure 1:
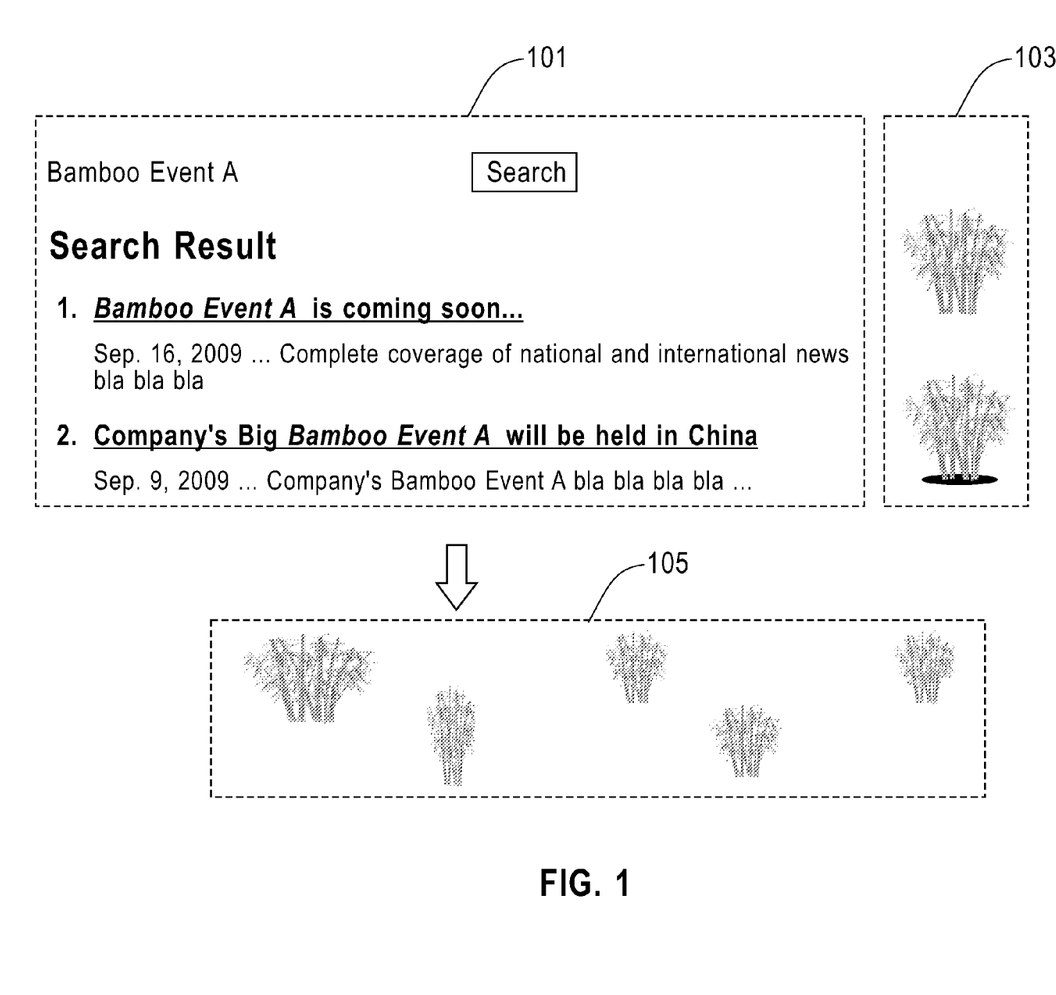
FIG. 1 shows a schematic diagram of a searching result according to an embodiment of the present invention.

In view of the existing defects in the prior art, Inventors observes in considerable practices and statistics that most currently used documents in various languages have corresponding images. Moreover, the documents will contain depictions, introductions or reviews related to the images. For example, 101 in FIG. 1 schematically shows a thumbnail of the text searching result obtained by a search engine based on a searching request in English from a user, while 103 shows the images in the documents corresponding to the top ranked searching results 1 and 2. If images in documents in other languages are compared based on the images as shown in 103, then relevant documents having a similar image in any language can be indirectly retrieved. Thus, the defects in the prior art multilingual documents searching can be overcome. The association between the images and the words in multilingual documents is especially true in those multilingual documents from Internet websites which are generated more professionally such as news report and professional websites such as travel and shopping websites. Multilingual documents from magazines and newspapers also reflect such association. Another example is a presentation document such as a PowerPoint PPT. Thus, the association between the words and images commonly exists in a document in one language. The inventive idea of the present application is to make use of such association.

Figure 2:
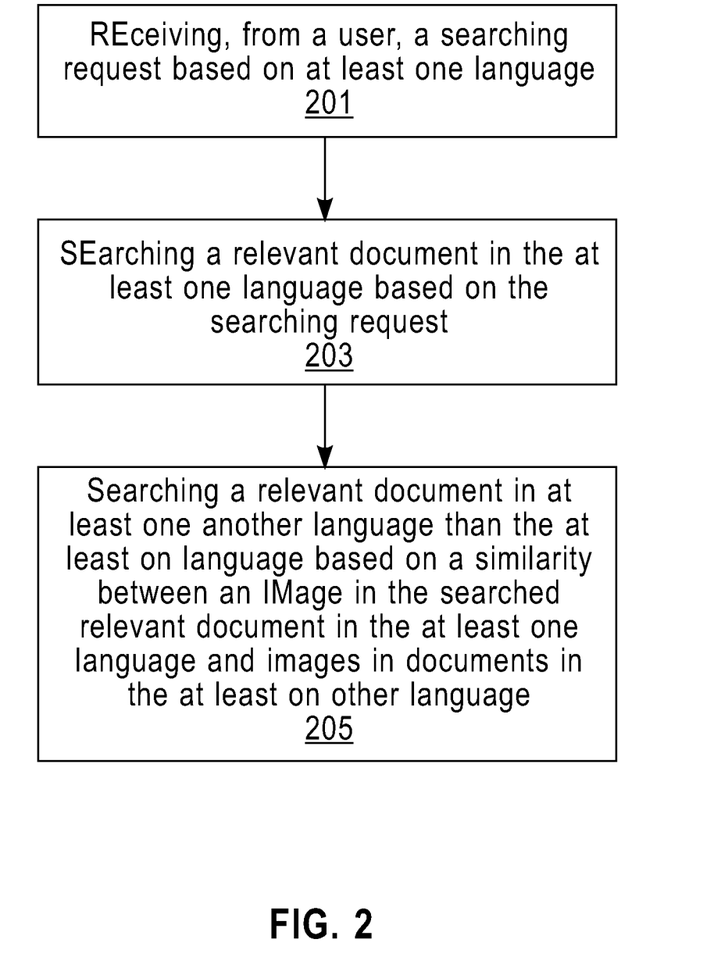
FIG. 2 shows a method for searching multilingual documents according to an embodiment of the present invention.

FIG. 2 shows a first embodiment of the present invention. At step 201, a searching request based on at least one language is received from a user. Generally speaking, the user will input in a search tool a searching request, for example a keyword of a topic of interest, based on their familiar language. However, if a user is familiar with more than one language, he is also allowed to input a searching request in more languages, which can be implemented by providing a plurality of search input interfaces.

At step 203, a relevant document in the at least one language is searched based on the searching request. Since the user uses its familiar language to input the searching request, this searching request can be deemed as being quite accurate. Then the searching can be performed for the documents in the language used by the user based on the user's searching request. It can be implemented by search technologies for current search engines such as Google and Baidu.

At step 205, relevant documents in other languages are searched based on a similarity between an image in the searched relevant document in the at least one language and images in documents in the at least one another language than the at least one language. There can be a plurality of algorithms in determining a similarity between images. For example, for images having histogram features, the probability distribution similarity (including histogram intersection, Chi square, etc.) of the histogram can be used as metrics, while for images with rectangular features or of other types, the Euclideam distance and Mahalanobis Distance of feature space can be used as metrics. Further, for a local feature, similarity can be derived based on clustered Hamming Distance.

It should be noted that regardless of the specific algorithms for determining similarity, it does not constitute a limit to the protection scope of the present invention, and any appropriate specific algorithm already known or developed in future can be employed according to the specific requirement. It can be determined which images in the documents in other languages are similar to the image in the documents a user has searched previously based on the calculated image similarity and a relevant threshold. Then the images in the documents in the other languages whose similarities with the image in the document in the at least one language are higher than a threshold are determined to have a higher similarity, and then the images in those documents in the other languages are determined as similar images.

The threshold can be selected by a technician in the background, or set automatically, for example, by setting the number of images required to select based on the number of documents to be returned as required by the user. Further, documents corresponding to these similar images are further obtained based on these similar images. In this way, the user can input a searching request based on his familiar language and obtain relevant documents in multiple languages.

Preferably, a main text extraction and a main image extraction can be performed on the obtained multilingual documents so as to establish a text library and an image library, respectively. Currently, there are many prior art rule-based or learning-based methods that can extract the main texts and main images. Specific extraction methods do not constitute a limit to the protection scope of the present invention, and they will not be detailed here. For multilingual documents formed by traditional media, the main texts and main images can be extracted by means of existing optical character recognition (OCR) technology and layout analysis technology.

For example, for a multilingual Internet news webpage, the largest text block or image block in the webpage can be used as the main text and main image. First, the main texts and their corresponding main images in a news webpage can be extracted, and the captions of the main texts, proper nouns, and surrounding texts of the main images (including graphical interpretation, and text around the image) can be extracted. Next a plurality of underlying features, including color, texture, edge, and local features of the main images are extracted, and then a classifier is constructed based on these features to determine whether the main images are advertisement images. If so, then this advertisement images are filtered. If a particular human name is mentioned in a news web page, then the human face detection method is executed on the filtered main images so as to obtain the location of the human face and to register. With the registered image, clustering can be performed based on the similarity of human faces. For more details, please refer to TURK et al., "Face Recognition Using Eigenfaces", Proc. IEEE Conf. on Computer Vision and Pattern Recognition, 1991, pp. 586-591. The idea is to obtain a plurality of potential orthogonal feature dimensions by calculating statistics on a considerable number of samples, and to obtain a new feature vector by projecting the new human face to the feature space and calculating the Euclidean Distance in this space.

Alternatively, reference can be made to the method as disclosed in the U.S. Pat. No. 5,012,522. In accordance with the above steps, it can be determined whether the main images include human faces of particular people. A text library and an image library are established after extracting the texts and images in the multilingual documents, where a mapping between respective texts in the text library and respective images the image library based on the relationship that the texts and the images originally belong to a same document. In this way, a bi-directional mapping between texts and images is established. Here, establishing the text library and the image library is a preferred embodiment of the present invention. In fact, it is also possible to combine the texts and images into one document, and using the method as discussed below to establish searching indexes for the texts or images, respectively, for the convenience of subsequent searching.

Figure 3A:
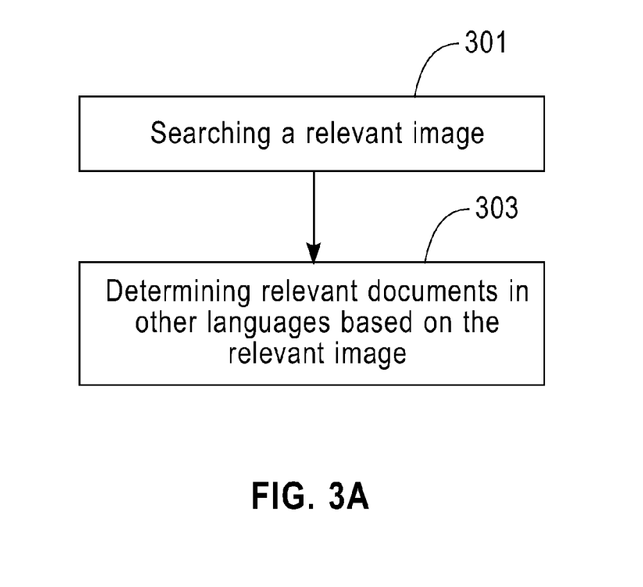
FIGS. 3a and 3b show flowchart diagrams for searching relevant documents in other languages according to an embodiment of the present invention.
Figure 3B:
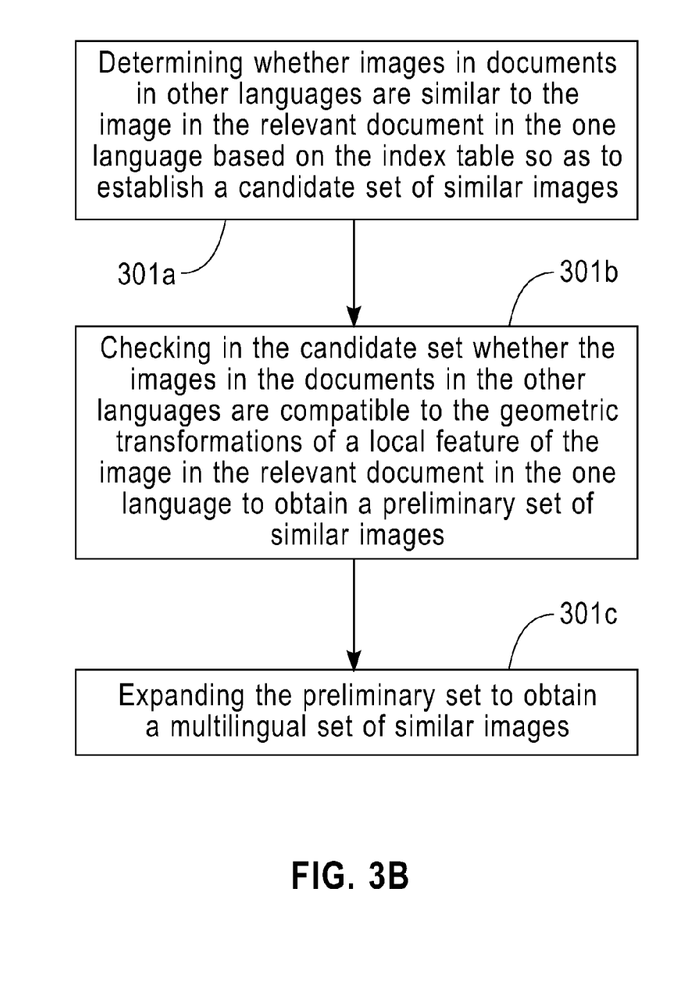

Based on the text library and image library, a preferred embodiment of searching relevant documents in the other languages is shown in FIGS. 3a and 3b. In step 301, in the image library, the images in documents in the other languages are compared with the image in the relevant document in one language, and the images in the documents in the other languages having a high similarity with the image in the relevant document in one language are determined as images in relevant documents in the other languages. Based on the comparison of similarity and predetermined threshold as discussed above, similar, even identical images can be found in the image library. Comparison of image similarity can be performed by extracting a local feature of the images. Extracting a local feature refers to extracting a feature within a certain small block of an image, such that the small blocks with similar positions and sizes can be stably extracted in the case of pictures being shot in different angles, even if the size or angle of the object vary somewhat in the shot pictures.

Preferably, local features of the images in the image library like SIFT (LOWE, "Distinctive image features from scale-invariant keypoints," International Journal of Computer Vision, 2004, pp. 91-110) or SURF (BAY et al., "Surf: Speeded up robust features", Computer Vision—ECCV 2006, 2006, pp. 404-417) can be extracted. These local features are quantized so as to establish an inverted index table to improve image comparison efficiency, where the quantization of a local feature can adopt the methods such as k-Means algorithm, hierarchical k-Means algorithm, or a lattice method (TUYTELAARS et al., "Vector quantizing feature space with a regular lattice", Proceedings of the International Conference on Computer Vision, 2007).

According to differences in the features adopted to the images, there are a plurality of methods in the prior art to establish an index such as a local feature-based inverted index (e.g. processing manner of similar texts) which can be adopted. For more details, please see PHILBIN et al., "Lost in quantization: Improving particular object retrieval in large scale image databases", CVPR, 2008. Further, an Approximate Nearest Neighbors index table can be established based on the Approximate Nearest Neighbors searching of the global features of the images such as color, texture, and edge features. OpenCV is an open source vision library developed by Intel, which has a BSD protocol and can be applied in business and study. A text index table can be established for the text library using a modern search engine, such as Google and Baidu.

FIG. 3b shows a preferred embodiment for searching similar images based on an established index table. In step 301a, based on at least one of the above inverted index table and the Approximate Nearest Neighbors index table, it is determined whether the images in documents in other languages are similar to an image in the relevant document in one language, so as to establish a candidate set of similar images. Based on a similarity threshold, several top ranked images (e.g., 100 images) are returned to establish a potential candidate set of similar images.

In step 301b, the candidate set is checked to determine whether the images in the documents in the other languages are compatible to the geometric transformations of a local feature of the image in the relevant document in one language, in order to obtain a preliminary set of similar images. For the calculation of the geometrical transformations of the local feature of the images, please see PHILBIN et al., "Object Retrieval with Large Vocabularies and Fast Spatial Matching," Proc. of Conference on Computer Vision and Pattern Recognition (CVPR), 2007. A geometrical transformation compatibility threshold is set to reject incompatible images, which can narrow the candidate set to thereby obtain a more precise preliminary set of similar images.

In step 301c, the preliminary set is expanded to obtain a set of multilingual similar images which will be taken as the relevant images. Since this preliminary set can miss many substantively identical images which cannot match due to too much local transformation, a searching expansion with respect to the preliminary set of similar sets can be conducted in the image library, so as to obtain more similar images. The searching expansion is a common practice in text and image searching, including steps of taking each image in the preliminary set as a search example, and repeating the above search steps 301a, 301b, and 301c in the image library to obtain extra similar images. This process can be iterated once or twice. The advantage of adopting the above preferred embodiment lies in that more complete set of similar images can be obtained in a better way, without missing too many similar images or including too many irrelevant images.

Further, in step 303, relevant documents in other languages can be determined based on the images in the relevant documents in the other languages and the mapping between the text library and the image library. Preferably, based on the mapping between the text library and the image library, a set of similar texts in the text library corresponding to the set of similar images can be obtained, and then the set of similar images and the corresponding set of similar texts constitute the relevant documents.

Figure 4:
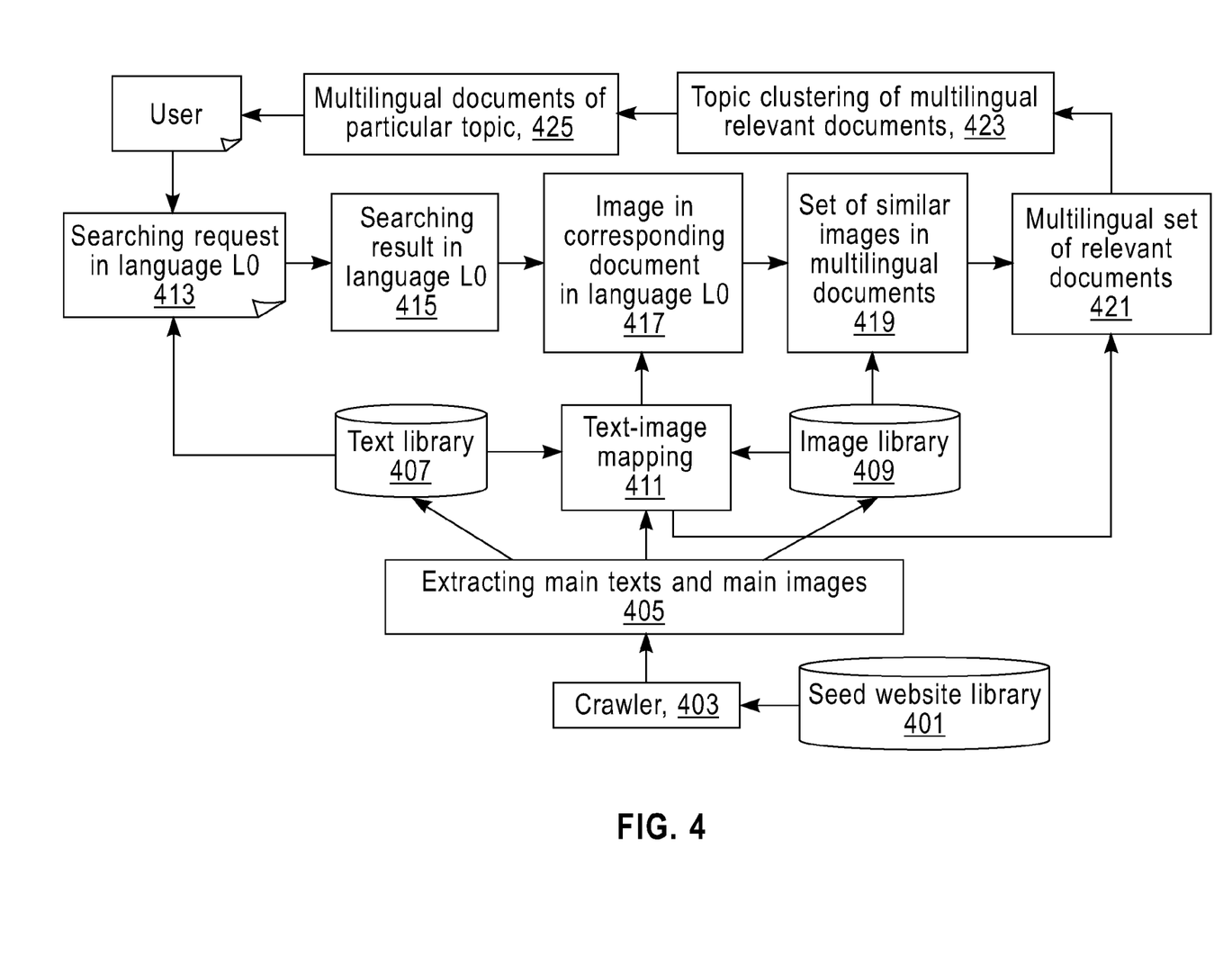
FIG. 4 shows another method for multilingual searching documents according to an embodiment of the present invention.

FIG. 4 shows another preferred embodiment of the present invention related to multilingual documents in the Internet. Of course, for other kinds of documents, this embodiment is likewise applicable if one slightly modifies the relevant steps of establishing a documents library.

In steps 401 and 403, a network automatic program (Crawler) is used to collect multilingual documents to form a multilingual documents library. A workflow of a crawler generally includes the following:

1. formulating seed websites and a download policy. The seed websites can be determined by a user, for example taking main websites of his concern as seed websites, or automatically set based on relevant website rankings. The download policy can contain constrains on the number and features of the web pages to be downloaded;

2. cyclically downloading the seed web pages and storing them to a specified location;

3. parsing the newly downloaded web pages, to obtain new qualified websites to be added to the seed websites; and 4. repeating the process until all of the seed web pages have been downloaded.

The specific network crawler technology does not constitute a limit to the protection scope of the present invention, and it can be selected by the skilled in the art according to the particular requirements. There are many crawlers available. The skilled in the art can also self-design a relevant crawler as practically required to snap news information in designated websites.

Steps 405, 407, 409, and 411 are for forming a text library and an image library as well as a mapping between these two. In step 405, based on the multilingual documents library obtained by the crawler, the main texts and their images are extracted using the extracting method as discussed above, such that a text library and an image library are established in steps 407 and 409.

Preferably, language type marks can be added to the texts in the text library, and language type marks can also be added to the images in the image library. In step 411, a mapping between the text library and the image library is established. It should be noted that though forming the text library and the image library as well as the mapping includes a plurality of steps, respective steps can be conducted simultaneously, across, or in sequence. Those skilled in the art can establish the mapping in any suitable way.

Preferably, a unique main_id can be assigned to a web page while snapping. The texts extracted from this page are placed into the text library and assigned with this id number (text_id=main_id), and the images extracted from this web page are stored in an image library and assigned with this image id number (image_id=main_id). Since a web page can include a plurality of images while a single main_id cannot distinguish them, it is further necessary to add a sub_id to the image_id on the basis of the main_id, indicating the serial number of the image in the web page, namely, image_id=main_id.sub_id. Therefore, once the text_id or the image_id is known, a text can be directly matched to a corresponding image.

Besides the above implementation, the image and text can be separately assigned with a serial number, and the mapping between the text library and the image library can be established using any kind of searching table such as a hash table. Preferably, an index table can also be established for the text library and the image library, respectively, so as to improve the search efficiency. The index table for the image library can be established based on the method as discussed above. For a text library, an index table can be established using the method for current search engine. Indexing is a core of current search engines, and the process of indexing is just a process of processing the source data to an index document which is quite convenient for searching.

A common method is a mechanism called inverted or reverse indexing. An inverted index maintains a word or phrase table. For each word or phase in this table, there is a chained list to depict which documents include this word or phrase. In this way, when the user inputs a search condition, the search results can be obtained very quickly. After indexes are established for the text library, searching can be conducted based on these indexes. The search engine will parse the searched keywords, and then the searching is performed for the established indexes. Finally, text that is related to keywords inputted by the user is returned.

Steps 413, 415, 417, 419, and 421 are for searching relevant documents in multilingual documents for the user. In step 413, a searching request based on a language L0 is received from the user. In step 415, searching is performed for the texts in the language L0 in the text library, in order to obtain relevant texts in the language L0 associated with the searching request. In step 417, relevant images corresponding to the relevant texts in the language L0 are determined based on the obtained relevant texts in the language L0 and the mapping between the text library and the image library. In step 419, based on any comparison method for image similarity mentioned above, similar images are searched in the image library based on the image index table. The obtained set of similar images is optimized and expanded according to the method as discussed in connection with FIG. 3b to thereby obtain a relatively relevant set of similar images.

Reference sign 105 in FIG. 1 shows a relevant set of similar images. It should be noted that some of the images seem dissimilar, but they are essentially similar and are just simply stretched, compressed, or trimmed. In order to improve efficiency, preferably, only images in documents in other languages than language L0 are compared based on the marks of the language types of the images. In step 421, combination is performed based on the set of similar images according to the mapping between the text library and the image library, in order to obtain relevant documents of multilingual documents. It should be noted that a set of similar images can include relevant images in language L0, and if not, the set of similar images and the relevant images in language L0 are combined into one set when forming relevant documents of the multilingual documents.

Alternatively, relevant documents can be corresponded. Then all of the relevant documents are combined to form a set of relevant documents of multilingual documents. Further, the user is allowed to select the languages of the documents which shall be additionally searched. For example, the user inputs a searching request in Chinese, and he can only additionally search documents in English or more other languages, so as to improve search efficiency and user experience.

Though what is described above only relates to an example where the searching request is in one language L0, if the user is familiar with more languages, he can input more searching requests with other languages. In this case, the above embodiment only needs to combine the search results in different languages. The other steps only need adaptive modification to implement this embodiment of the present invention.

The above obtained set of relevant documents in multilingual documents can be displayed to the user. Preferably, in step 423, topic clustering can be performed on the set of relevant documents of multilingual documents. In step 425, the clustered documents are recommended to the user according to a particular topic. There can be a plurality of methods for implementing topic clustering. For example, a multilingual text clustering policy of "first-clustering-then-combining" can be employed, where a single language text clustering is firstly conducted, and then results of single language text clustering are combined to thereby obtain a multilingual text cluster. For the single language text clustering such as a common text clustering, the term frequency information (TFIDF) for each word in the text is calculated, and then the text is expressed as a vector with a vector space model. Finally they are clustered with a clustering algorithm. After the single language text clustering is performed to each language, respective kinds of clusters in respective languages are combined. The combination policy employs cross-language matching between key vocabularies in respective kinds of clusters. For more details, please see CHENGZHI et al., "Survey on Multilingual Document Clustering", New Technology of Library and Information Service, 2009, pp. 31-36.

Figure 5:
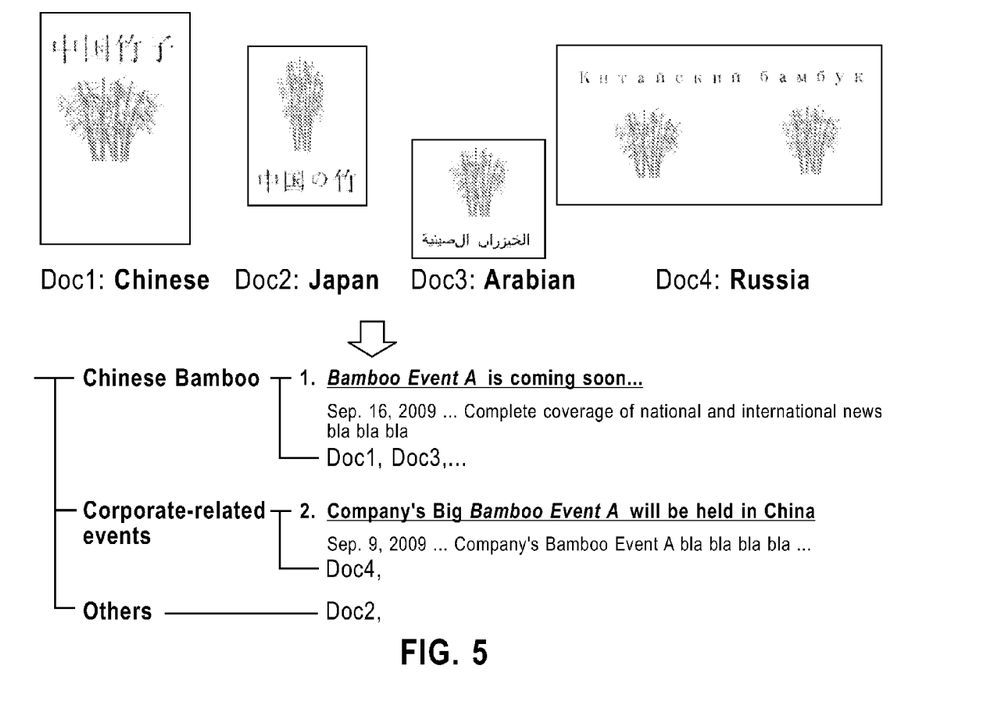
FIG. 5 schematically shows presentation of a searching result according to an embodiment of the present invention.

FIG. 5 schematically shows a clustered document displayed to the user. FIG. 5 shows a search on bamboo-related events. Multilingual documents are browsed according to topics, where Doc1, Doc3, and the original English searching result 1 are assigned to the topic "Chinese bamboo." Doc4 and the original English searching result 2 are assigned to the topic "company-related events." Doc2 is unrelated to the original topics and thus assigned to other topic, so as to provide convenience to users who browse by topic.

Figure 6:
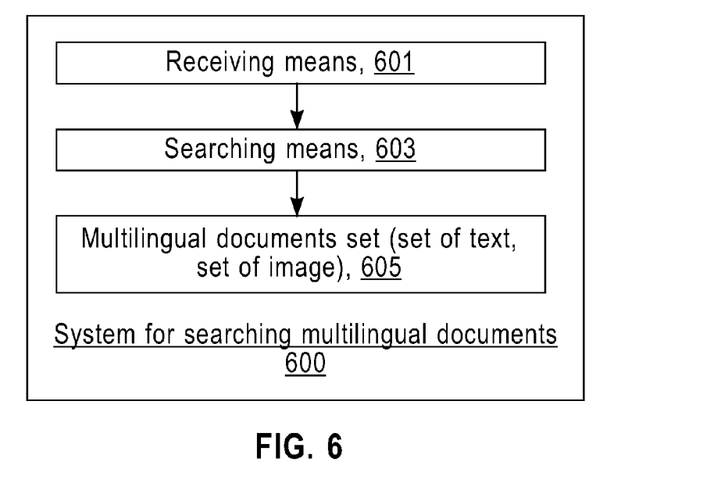
FIG. 6 shows a block diagram of a multilingual search system according to an embodiment of the present invention.

According to another embodiment of the present invention, there is further provided a system for searching multilingual documents. This system 600 for searching multilingual documents includes receiving means 601 configured to receive, from a user, a searching request based on at least one language. The system further includes searching means 603 configured to search a relevant document in the at least one language based on the searching request, and to search a relevant document in at least one another language than the one language based on a similarity between an image in the relevant document in the at least one language and an image in a document in at least one another language.

Preferably, the system further includes means for establishing a text library and an image library for multilingual documents, and means for determining a mapping between the text library and the image library. Preferably, searching a relevant document in the at least one language based on the searching request includes searching a relevant document in the at least one language in the text library. Preferably, searching a relevant document in the at least one language based on the searching request further includes determining an image in the relevant document in the at least one language in the image library based on the mapping between the text library and the image library.

Preferably, the searching means 601 includes means for comparing images in documents in at least one another language in the image library based on the image in the relevant document in the at least one language and for determining the images in the documents in other languages having a high similarity with the image of the relevant document in the one language as images in relevant documents in other languages. Preferably, the searching means 601 also includes means for determining relevant documents in the at least one another language based on the images in the relevant documents in the at least one another language and the mapping between the text library and the image library. Preferably, the images are the main images in respective multilingual documents.

Preferably, the system 600 further includes at least one of: means for extracting local features of the images in the image library and quantizing the local features to establish an inverted index table; or means for extracting global features of the images in the image library and establishing an Approximate Nearest Neighbors index table based on the global features.

Preferably, the means for comparing images in documents in the at least one another language in the image library based on the image in the relevant document in the at least one language and determining the images of the documents in the other languages having a high similarity with the image in the relevant document in the one language as images in relevant documents in the other languages includes: means for determining whether the images in the documents in the other languages are similar to the image in the relevant document in the at least one language based on at least one of the above inverted index table and the Approximate Nearest Neighbors index table so as to establish a candidate set of similar images; means for checking whether the images in the documents in the at least one another languages are compatible to the geometric transformations of the local feature of the image in the relevant document in the at least one language in the candidate sets to obtain a preliminary set of similar images; and means for expanding the preliminary set to determine a final set of similar images.

Preferably, the means for establishing a text library and an image library for multilingual documents includes means for establishing a multilingual documents set 605 through a crawler; and means for extracting main texts and main images from the multilingual documents set to establish the text library and the image library.

Preferably, there further includes means for performing topic clustering on the searched relevant document in the at least one language and the relevant documents in the at least one another language to display to a user.

According to relevant embodiments of the present invention, image similarity is taken as a bridge for performing multilingual documents searching, which overcomes the problems of search inability or missing incurred by translation problems in the prior art cross-language search system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Though the present invention has been illustrated and depicted with reference to the preferred embodiments of the present invention, a person of normal skill in the art should understand that various modifications on its form and details are allowed without departing from the spirit and scope of the present invention as limited in the appending claims.

The invention claimed is:

1. A computer implemented method for searching multilingual documents, the method comprising the steps of:
    receiving a search request based on at least one language;
    searching a first relevant document using said search request wherein said first relevant document is written in a first language and includes a first image;
    searching a data source for a second relevant document having a second image which is similar to said first image and is written in a second language;
    searching said second relevant document using said search request;
    establishing a text library and an image library for multilingual documents, wherein said establishing comprises collecting, using a network automatic program, a multilingual document to establish a multilingual document library;
    extracting main texts and main images from said multilingual document library to establish the text library and the image library;
    mapping said text library to said image library; and
    wherein at least one of said steps are carried out by a computer device.

2. The method according to claim 1, wherein said searching said first relevant document step comprises the step of:
    searching said first relevant document using said text library.

3. The method according to claim 2, wherein said searching said first relevant document further comprises:
    matching said first image to a third image in said image library based on said mapping between said text library and said image library.

4. The method according to claim 1, wherein said finding step comprises the steps of:
    comparing said second image to said first image using said image library wherein said second image and said first image are contained within said image library;
    finding a relevant image wherein said relevant image is an image from said first relevant document which is highly similar to an image from second relevant document; and
    finding a third relevant document based on said relevant image and said mapping between said text library and said image library.

5. The method according to claim 4, further comprising at least one of the following:
    extracting a local feature of an image in said image library and quantizing said local feature to establish an inverted index table; or
    extracting a global feature of the image in said image library and establishing an Approximate Nearest Neighbors index table based on said global feature.

6. The method according to claim 5, wherein said finding said relevant image step comprises the steps of:
    establishing a candidate set of similar images by determining whether said image from said first relevant document is similar to said image from said second relevant document based on said inverted index table or said Approximate Nearest Neighbors index table;
    determining whether said image from said second relevant document is compatible to geometric transformations of a local feature of said image from said first relevant document to obtain a preliminary set of similar images; and
    determining a final set of similar images by expanding said preliminary set.

7. The method according to claim 1, wherein said first image and said second image are a main image in a respective multilingual document.

8. The method according to claim 1, further comprising the step of:
    performing topic clustering on said first relevant document and said second relevant document.

9. A system for searching multilingual documents, the system comprising:
    means for receiving a searching request based on at least one language;
    means for searching a first relevant document using said search request wherein said first relevant document is written in a first language and has a first image;
    means for searching a data source for a second relevant document having a second image which is similar to said first image and is written in a second language;
    means for searching said second relevant document using said search request;
    means for establishing a text library and an image library for the multilingual documents, wherein said means for establishing comprises means for collecting, using a network automatic program, a multilingual document to establish a multilingual document library;
    means for extracting main texts and main images from said multilingual document library to establish said text library and said image library;
    means for mapping said text library to said image library.

10. The system according to claim 9, wherein said means for searching a first relevant document comprises:
    means for searching said first relevant document in the at least one language in the text library.

11. The system according to claim 10, wherein said means for searching a first relevant document further comprises:
    means for matching said first image to a third image in said image library based on said mapping between said text library and said image library.

12. The system according to claims 9, wherein said means for finding comprises:
    means for comparing said second image to said first image using said image library wherein said second image and said first image are contained within said image library;
    means for finding a relevant image wherein said relevant image is an image from said first relevant document which is highly similar to an image from second relevant document; and
    means for finding a third relevant document based on said relevant image and said mapping between said text library and said image library.

13. The system according to claim 12, where the system further comprises at least one of the following:
    means for extracting a local feature of an images in said image library and quantizing said local feature to establish an inverted index table; and
    means for extracting a global feature of said images in said image library and establishing an Approximate Nearest Neighbors index table based on said global feature.

14. The system according to claim 13, wherein said means for finding said relevant image comprises:
    means for establishing a candidate set of similar images by determining whether said image from said first relevant document is similar to said image from said second relevant document based on said inverted index table or said Approximate Nearest Neighbors index table;
    means for determining whether said image from said second relevant document is compatible to geometric transformations of a local feature of said image from said first relevant document to obtain a preliminary set of similar images; and
    means for determining a final set of similar images by expanding said preliminary set.

15. The system according to claim 9, wherein said first image and said second image are a main image in a respective multilingual document.

16. The system according to claim 9, further comprising:
    means for performing topic clustering on said first relevant document and said second relevant document.

17. A computer readable storage device tangibly embodying a computer readable program code having computer readable instructions which when implemented, cause a computer to carry out a method, comprising the steps of:
    receiving a search request based on at least one language;
    searching a first relevant document using said search request wherein said first relevant document is written in a first language and has a first image;
    searching a data source for a second relevant document having a second image which is similar to said first image and is written in a second language;
    searching said second relevant document using said search request;
    establishing a text library and an image library for multilingual documents, wherein said establishing comprises collecting, using a network automatic program, a multilingual document to establish a multilingual document library;
    extracting main texts and main images from said multilingual document library to establish the text library and the image library; and
    mapping said text library to said image library.

* * * * *